Patented Dec. 12, 1944

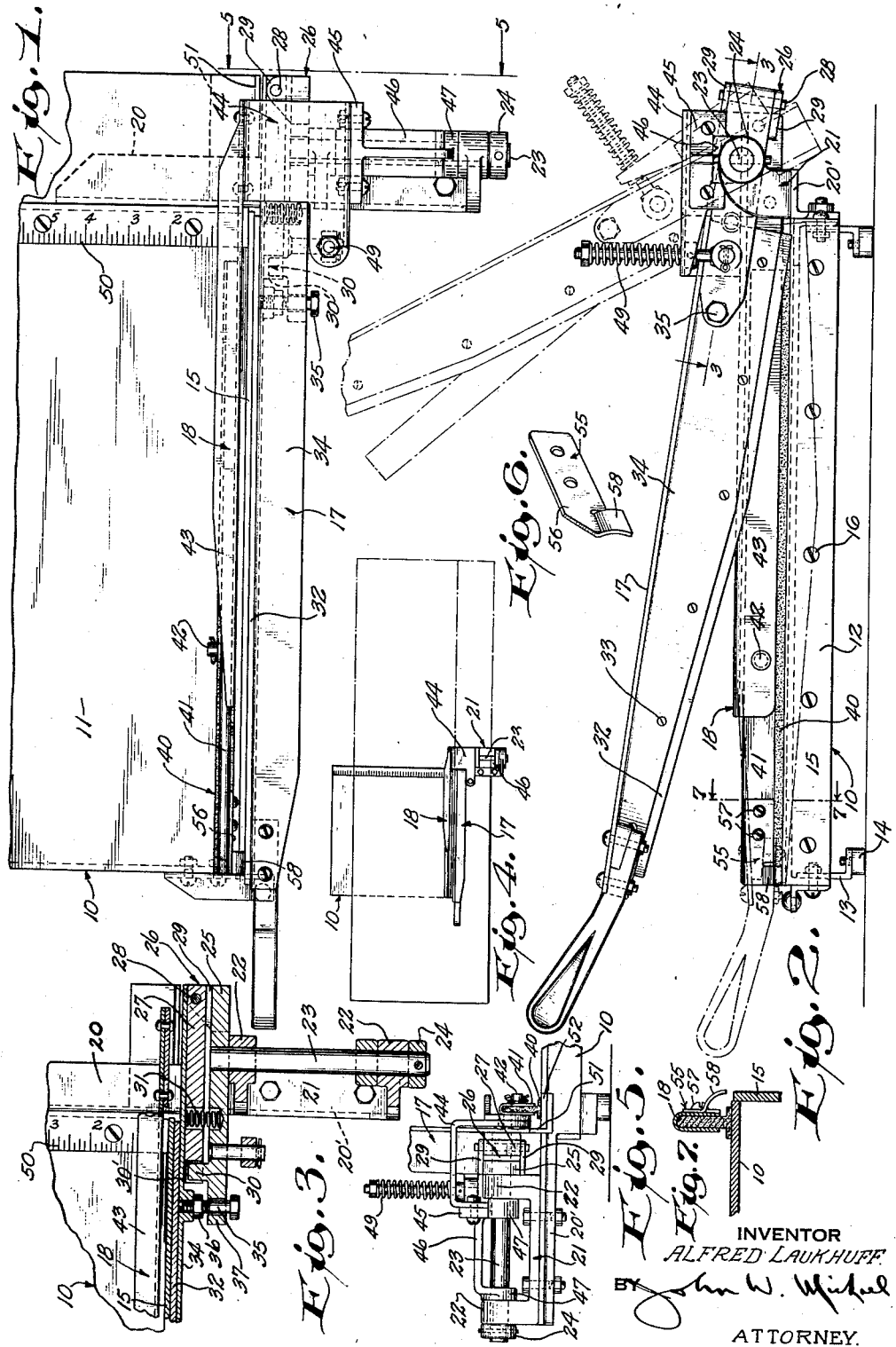

2,364,985

UNITED STATES PATENT OFFICE 2,364,985

CUTTING MACHINE

Alfred Laukhuff, Milwaukee, Wis.

Application July 16, 1942, Serial No. 451,100

4 Claims. (Cl. 164—45)

This invention relates to an improvement in machines for cutting paper or similar sheet-like material, and is in the nature of an improvement on my United States Letters Patent 2,254,374, granted September 2, 1941, for a "Cutting machine."

The object of the present invention is to improve and enhance the structure and organization of a machine of the character disclosed and claimed in said patent and to do this in such a way as to preserve all of the advantages of the patented machine while obtaining greater facility in cutting and giving the operator of the machine better control over the accuracy of the cut.

Generally speaking, these advantages are obtained by providing a simple and effective outboard bearing for the movable cutter as well as for the work clamp, and by combining with the cutting or work table and the work clamp simple though effective gauges which facilitate the proper positioning of the paper or sheet-like material to be cut.

Another and important object of the invention is to provide a cutting machine of this character which is so constructed and organized as to be capable of cutting a sheet of unlimited length, the sheet being fed through the machine and subjected to successive cuts. Guides are incorporated in the machine for guiding the sheet adjacent both ends of the cutting table so as to insure a straight cut.

Another object of the invention is to provide a cutting machine having these advantages and capacities, and which is simple, compact, closely organized and durable in construction, efficient and speedy in operation, readily controllable and operable, and easily and comparatively inexpensive to manufacture.

Other objects and advantages reside in certain novel features of the construction, arrangement, and combination of parts, which will be hereinafter more fully described and particularly out in the appended claims, reference being had to the accompanying drawing forming a part of this specification, and in which:

Figure 1 is a fragmentary plan view showing a cutting machine embodying the present invention;

Figure 2 is a view in end elevation of the cutting machine shown in Figure 1, the machine in Figure 2 being viewed from the movable cutter side of the machine;

Figure 3 is a fragmentary view in cross section, taken on line 3—3 of Figure 2 and looking in the direction of the arrows;

Figure 4 is a diagrammatic view in top plan illustrating the manner in which the improvements embodied in the machine facilitate the continuous cutting of an elongated sheet of material;

Figure 5 is a fragmentary view in elevation, the view being taken from line 5—5 of Figure 1;

Figure 6 is a detail perspective view of the gauge which is combined with the work clamp; and Figure 7 is a view on line 7—7 of Fig. 2.

Referring to the drawing, it will be seen that the cutting machine embodying the present invention comprises a cutting table, designated generally at 10, and which may comprise a flat metal plate 11 suitably secured to a rectangular metal frame 12, the frame 12 being made up of angle iron. Supporting feet 13 are secured to and extend downwardly from the frame and are equipped with suitable pads 14 so that the work table may rest in a horizontal position or any suitable support.

Fixed to one side of the frame is a fixed knife or blade 15. The knife 15 is usually constituted of tool steel and is rigidly although removably secured in place by a suitable number of countersunk screws 16.

Cooperable with the fixed blade 15 is a movable blade or knife, designated as a whole at 17.

Combined and coordinated in its action with the movable knife 17 is a work clamp, designated generally at 18.

The manner in which the movable knife 17 and its cooperable work clamp 18 are constituted, mounted, and operated will now be described.

At the rear of the cutting or work table 10 an angle iron 20 is securely bolted or otherwise suitably fastened to the adjacent frame member of the work table. This angle iron projects at one end beyond the knife side of the work table, the projecting portion being designated at 20'. Supported on the projecting portion 20' of the angle iron 20 is a bearing bracket 21 which has spaced bearings 22 integral therewith. A cutter shaft 23 is rotatably supported in the bearings 22. The outer end of the cutter shaft has a collar 24 pinned or otherwise suitably fixed thereto to prevent endwise movement of the shaft 23 in one direction. The inner end of the shaft 23 projects beyond the adjacent bearing 22, as illustrated to advantage in Figure 3, and the extremity thereof is fitted and secured in an opening provided therefor in the fixed hinged plate 25 of a hinge, designated generally at 26. The hinge 26 includes not only the fixed hinge plate 25, that is fixed with respect to the shaft although rotatable therewith, but also includes a swingable or movable hinge plate 27 pivotally supported at one end by means of a hinge pin 28 to hinge ears 29 secured to the fixed hinge plate 25 and projecting laterally therefrom. To relieve the hinge or pivot pin 28 of strain, the hinge plates 25 and 27 are positively though swingably interconnected by means of a key 30 integral with the hinged plate 25 and slidable in a horizontal keyway or slot 30' formed in the hinged plate 27. A compression coil spring 31 accommodated in opposed recesses in the hinged plates 25 and 27 forces the hinge plate 27 away from the hinged plate 25.

The movable knife 17 includes a knife blade or cutter blade 32 fastened by screws 33 to a knife carrier 34. The carrier is in the form of an angle iron with its flanges appropriately tapered. At one end the flanges of the carrier 34 embrace portions of the hinged plates 25 and 27. The flanges of the knife carrier 34 are rigidly fastened to the movable hinged plate 27 of the hinge 24 in any suitable way. The extent to which the carrier may move is limited by means of a stud 35 threaded into the vertical flange of the knife carrier 34 and secured into position by lock nut 36. The shank of the stud 35 extends loosely through an opening 37 provided in the fixed hinged plate 25. The head of the stud 35 is engageable with the knife carrier 34 to perform the limiting or stopping function. The hinged mounting of the movable knife described per se forms no part of the present invention since it is described and claimed in my patent above referred to. It has been described here merely to make clear how it is incorporated in the improved construction.

The mounting of the movable knife 17 differs in a substantial and important respect from that of the patented construction in that the bearings 22, which support the cutter shaft 23 on which the hinge 26 is carried, are outboard with respect to the cutting table and hence leave the cutting table unobstructed. And these same bearings also provide an outboard support for the work clamp 18.

The work clamp 18 comprises a strip of rubber 40 of inverted T shape in cross section with the leg of the T received in the channel of a channel-shaped sheet metal holder 41. The rubber strip 40 of the work clamp 18 is frictionally fitted in its holder 41 and is also retained therein by means of the pivot stud 42 which passes through both the holder and the leg of the rubber strip 40 as well as through the depending flange of an angle iron 43 which constitutes a support or a carrier for the work clamp 18. The rearward end of this angle iron 43 is rigidly fastened to a yoke 44 which comprises an element of the support for the work clamp 18. In the construction illustrated, the yoke 44 is of inverted U shape, and the angle iron carrier 43 is fastened to one of the depending legs of the yoke 44. The yoke straddles the rear end of the knife 17 and its outer leg is fastened to an attaching plate 45 of a bracket 46 which in turn has bearings 47 receiving and secured to intermediate portions of the cutter shaft 23. Of course, the support for the work clamp may be constituted in various ways other than in the particular way described. The essential characteristic of this support is that it be fixed to and rotated with the cutter shaft and that it has an extension which straddles or overhangs the knife. By constituting the work clamp support in this way it is also outboard in its nature, and hence does not obstruct the work table and consequently does not interfere with the feeding of a long sheet of material to be cut continuously across the table and through the knife as illustrated in Figure 4.

The conventional lift spring and link arrangement 49 is provided to yieldably maintain the movable knife or cutter 17 in elevated position.

Extending transversely off the table 10 is the usual graduated gauge bar 50. In addition to this gauge bar 50 the present invention provides additional means to facilitate the placing of the sheet on the cutting table to insure the correct line of cut. This additional means comprises generally an abutment gauge 51 and a line indicator 55, the abutment gauge 51 being fixed in position on the table at a point adjacent the edges of the knives which effect the initial cutting and the line indicator 55 being secured to the work clamp adjacent its outer end.

The abutment gauge 51 comprises a small angle iron lug-like structure fastened to the shelf 52 which is in effect merely an extension of the cutting table. This abutment gauge 51 has the inner surface of its vertical flange in the same vertical plane as that of the cutting plane of the machine.

The line indicator 55 comprises an attaching portion 56 secured by screws 57 to the work clamp holder. Integral with the attaching portion 56 the line indicator is an outwardly offset line indicating portion 58 which is substantially coincident and coplanar with the cutting plane of the machine.

When the operator places the sheet to be cut on the work table and grasps the handle and presses the movable knife 17 and work clamp 18 down until the work clamp 18 engages the table, then the abutment gauge 51 serves the purpose of locating the inner end of the sheet in proper position, and the operator can observe from the line indicator 55 where the outer portion of the sheet is to be positioned and, of course, manually positions it under the exercise of his own vision. Now then, as the movable knife 17 is brought down past the fixed knife 15 the correct line of cut is had.

I claim:

1. A cutting machine comprising a cutting table, a fixed knife secured thereto, a support projecting outwardly from the table adjacent the fixed knife, an outboard bearing carried by said support, a cutter shaft rotatably supported in said outboard bearing, the inner end of the shaft terminating in spaced relation to the fixed knife, and a movable knife mounted on the inner end of the cutter shaft and disposed in cooperative relation to the fixed knife, in combination with a work clamp disposed in parallel relation to said knives and in cooperative relation to the table, and a support for the work clamp carried by the cutter shaft and overhanging the inner end of the fixed knife.

2. A cutting machine comprising a cutting table, a fixed knife secured thereto, a support projecting outwardly from the table adjacent the fixed knife, spaced bearings carried by said support, a cutter shaft rotatably supported in said outboard bearing, the inner end of the shaft terminating in spaced relation to the fixed knife, a movable knife mounted on the inner end of the cutter shaft and disposed in cooperative relation to the fixed knife, a work clamp disposed in parallel relation to said knives and in cooperative relation to the table, a bracket fixed to the cutter shaft intermediate its bearings, and a yoke of inverted U-shaped form having one leg fixed to the bracket, having its body portion spanning the inner end of the fixed knife, and having its other leg secured to and supporting the work clamp.

3. A cutting machine comprising a cutting table, a fixed knife secured to one edge thereof, a movable knife cooperable with the fixed knife, a work clamp paralleling the knives interconnected with the movable knife and in cooperative relation to the cutting table, an abutment gauge fixed to the table at a point adjacent the initially active cutting edges of the knives and having its active gauging surface located in the cutting plane, and a line indicator carried by the outer end of the work clamp whereby the operator of the machine may, by engaging the edge of the sheet with the abutment gauge and adjusting it under the guidance of the line indicator, assure the correct line of cut.

4. A cutting machine comprising a cutting table, a fixed knife secured to one edge thereof, a movable knife cooperable with the fixed knife, a work clamp paralleling the knives, interconnected with the movable knife and in cooperative relation to the table, an abutment gauge comprising a lug-like structure mounted on the table adjacent the point where the cutting edges of the knife initiate their action and having a vertical gauging surface in the same vertical plane as that of the cutting plane of the machine and a line indicator carried by the outer end of the work clamp and comprising an attaching portion fastened to the work clamp and having an integral, outwardly offset, line indicating portion substantially coincident and coplanar with the cutting plane of the machine.

ALFRED LAUKHUFF.